United States Patent
Price et al.

[15] 3,687,556
[45] Aug. 29, 1972

[54] NAVIGATION SYSTEM

[72] Inventors: Harold J. Price, North Palm Beach; Robert M. Snyder, Jupiter, both of Fla.

[73] Assignee: Oceanography Development Corporation, Riviera Beach, Fla.

[22] Filed: Sept. 18, 1970

[21] Appl. No.: 73,357

[52] U.S. Cl. ............. 356/152, 356/1, 356/141, 350/6, 350/7, 350/285, 340/6, 343/102, 343/106, 343/112 R
[51] Int. Cl. .................................. G01b 11/26
[58] Field of Search .......... 250/199; 356/152, 141, 1; 343/106, 112 D; 340/6; 350/285, 6, 7

[56] References Cited

UNITED STATES PATENTS

| | | | |
|---|---|---|---|
| 3,430,243 | 2/1969 | Evans | 343/112 D |
| 2,523,398 | 9/1950 | Southworth | 343/112 D |
| 2,485,582 | 10/1949 | Frum | 343/106 |
| 2,668,288 | 2/1954 | Perilhou | 343/112 D |
| 2,830,487 | 4/1958 | Griffith | 356/4 |
| 3,519,349 | 7/1970 | Berthold | 356/4 |
| 3,475,552 | 10/1969 | Makino et al. | 350/285 |
| 3,485,546 | 12/1969 | Roth | 350/285 |

Primary Examiner—Benjamin A. Borchelt
Assistant Examiner—S. C. Buczinski
Attorney—Oblon, Fisher & Spivak

[57] ABSTRACT

A position locating method and apparatus are provided which feature continuously rotating a transmitter device for generating a fan-shaped beam signal from a single reference point and monitoring the signal at a position spaced from the reference point with a single detector having a pair of signal receiving members spaced apart a predetermined distance for detecting the passage of the signal sequentially therethrough. The transmitter preferably is a laser beam source which is amplitude modulated with high frequency repetitive pulses to provide precise timing signals for measurement at the receiver and frequency modulated in a linearly increasing fashion during each revolution for providing bearing information. The range, or distance, between the source and the signal-receiving detector, is derived by measuring the time interval elapsing between the receipt of the rotating beam signal respectively by the pair of receiving members. In order to provide signal identification and also information regarding the angular rotational speed of the beam, the beam may also be amplitude modulated at a relatively slow rate.

20 Claims, 18 Drawing Figures

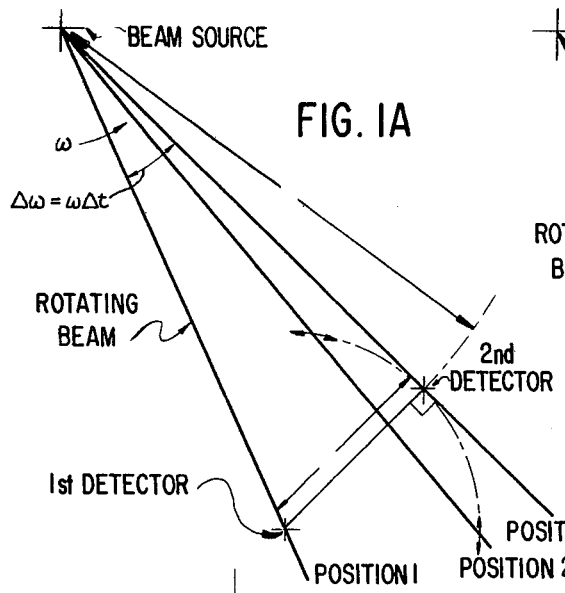
FIG. IA
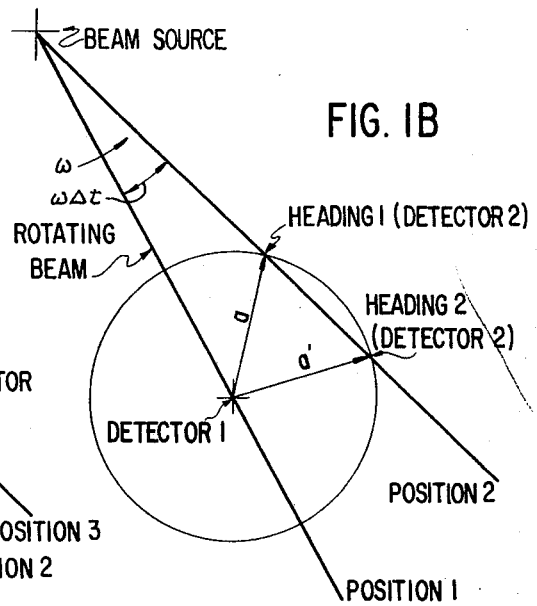
FIG. IB
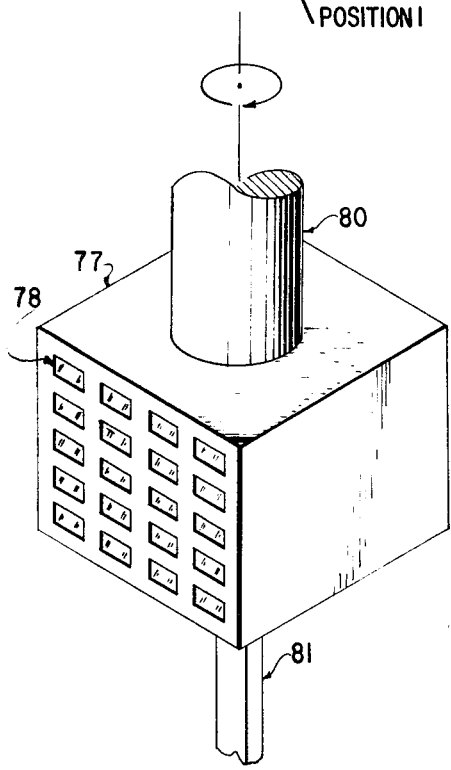
FIG. 13A
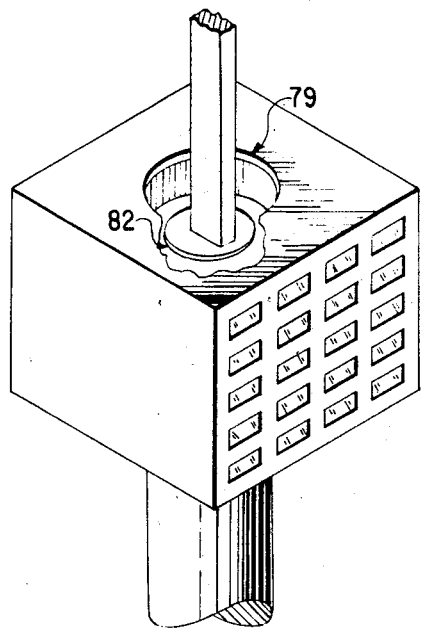
FIG. 13B
INVENTORS
ROBERT M. SNYDER
HAROLD J. PRICE
BY *Oblon, Fisher & Spivak*
ATTORNEYS

PATENTED AUG 29 1972 3,687,556

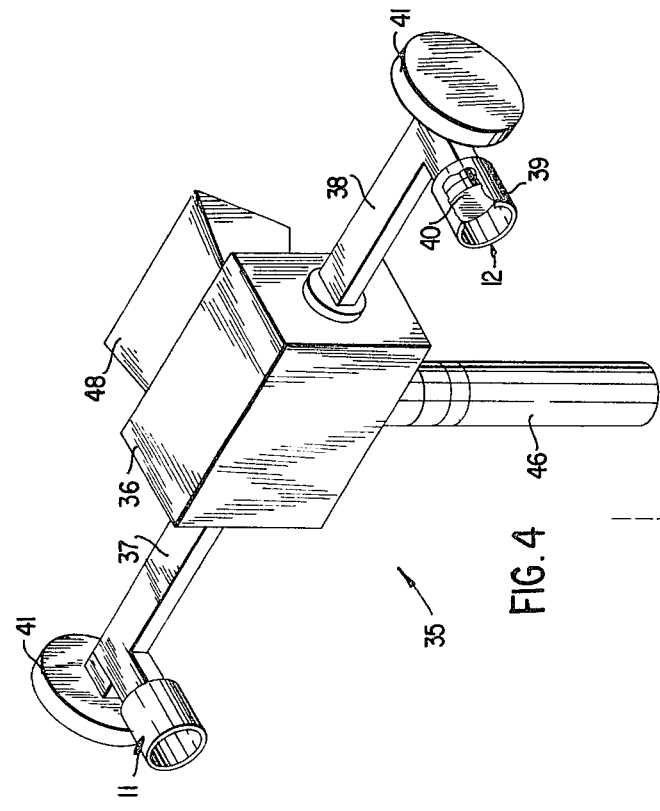
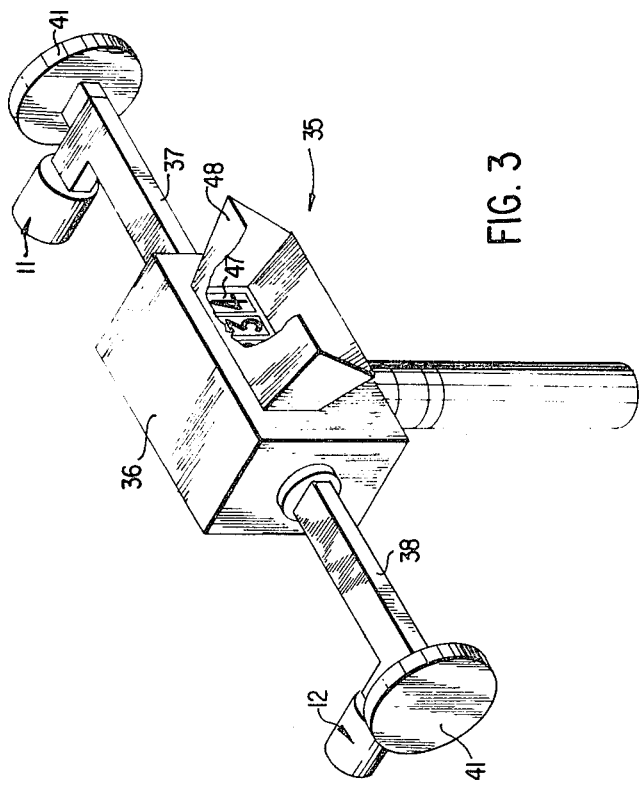
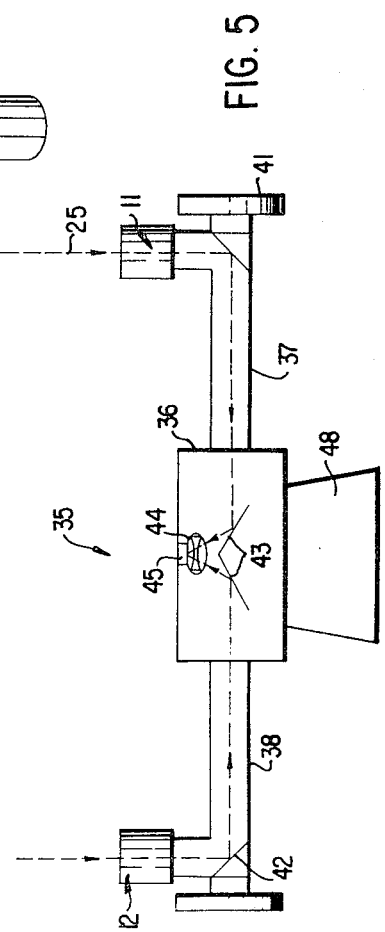

FIG. 6
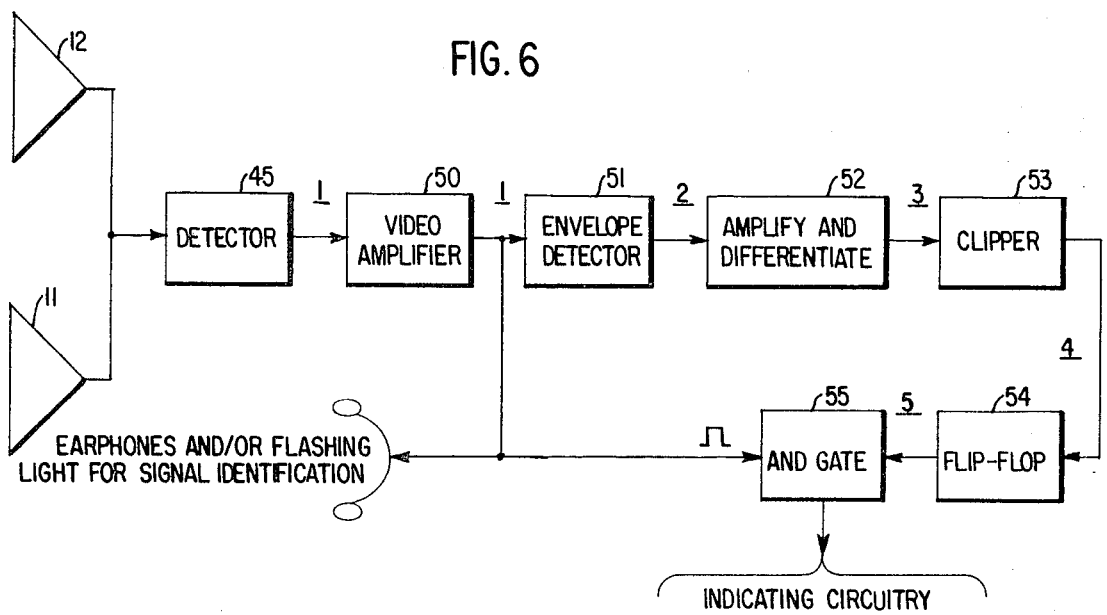
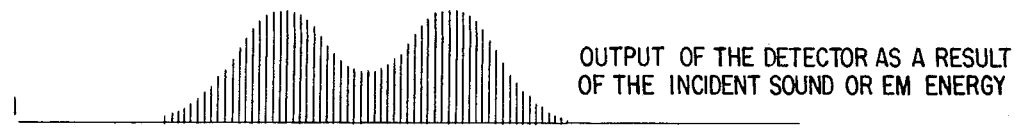
OUTPUT OF THE DETECTOR AS A RESULT
OF THE INCIDENT SOUND OR EM ENERGY
AFTER ENVELOPE DETECTION
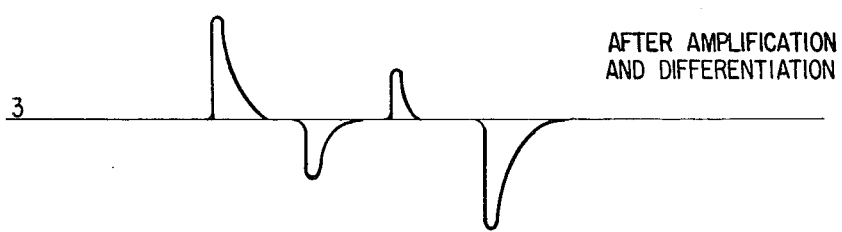
AFTER AMPLIFICATION
AND DIFFERENTIATION
FIG. 7
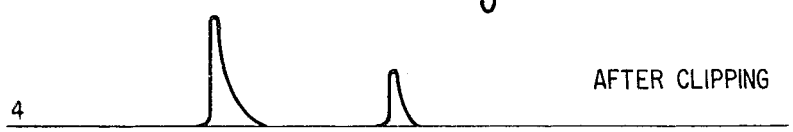
AFTER CLIPPING
OUTPUT OF
FLIP-FLOP R — RANGE
D — DISTANCE BETWEEN DETECTORS
T — TIME INTERVAL BETWEEN INTERCEPTIONS OF ROTATING SOURCE
W — ANGULAR ROTATIONAL SPEED OF SOURCE

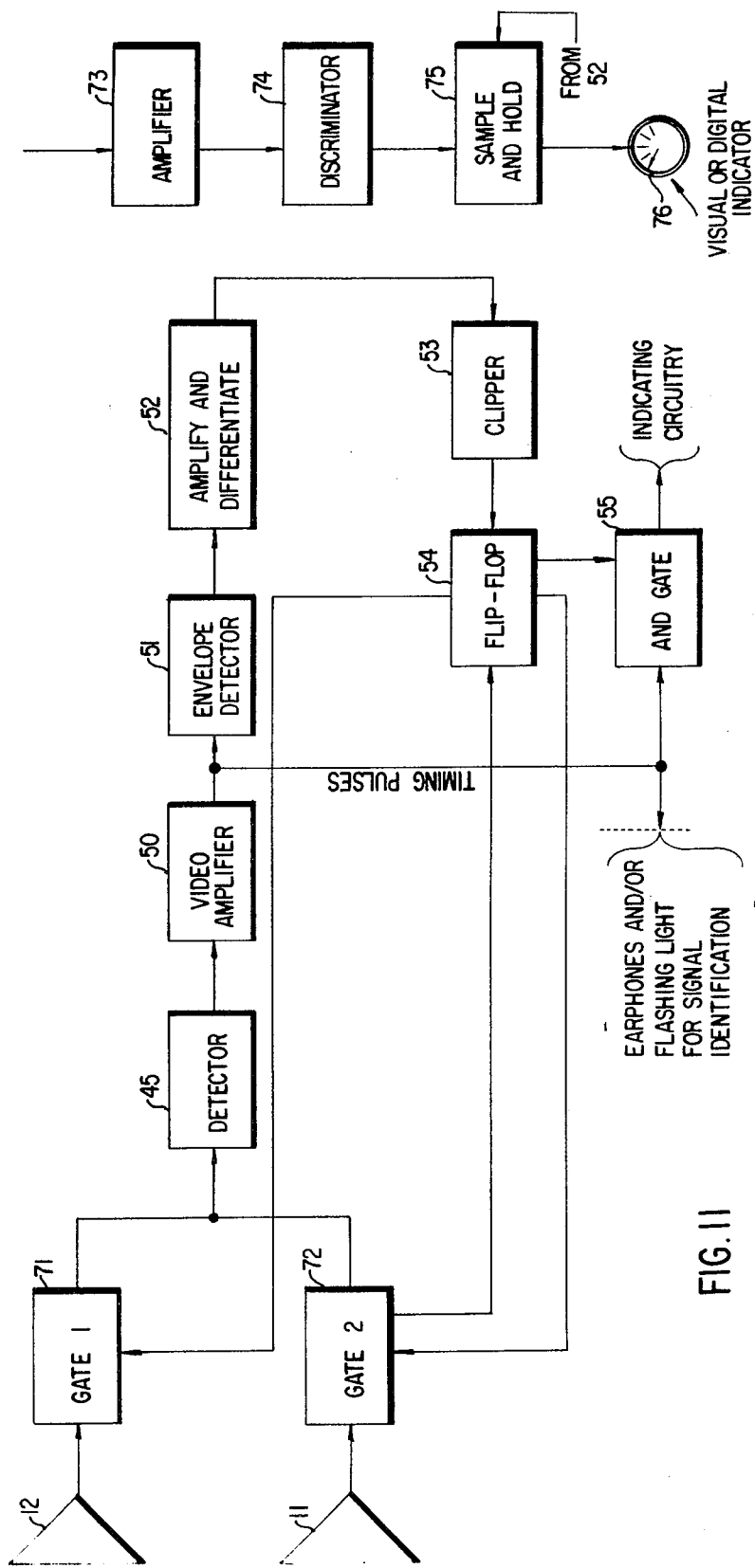

NAVIGATION SYSTEM

BACKGROUND OF THE INVENTION

The present invention relates generally to navigation systems and more particularly to a method and apparatus for determining the position of an observer relative to a given reference point, including the range and bearing relative thereto.

In the past, many systems have been developed for locating the positions of ships, planes and the like relative to other positions or reference points which typically place a radio beam or visible light source at the reference point and continuously rotate the same at a constant rate while simultaneously directing a beam of energy therefrom to be detected at a receiving station where, by timing the rotation from a predetermined reference direction, the azimuth, or bearing from the reference direction, may be readily determined. For determining the distance between the reference points and the beam signal-receiving station, a pair of spaced beams may be transmitted, whereby the interval of time between the times of receipt of the beams at the receiving station provides information relative to the range, or, alternatively, the range may be determined by using a pair of spaced receiving antennae through which the directional beam sequentially sweeps in rotation, in which case, in a similar fashion, the range is a function of the interval between the times of reception of the beam at the respective antennae.

Although the aforementioned prior art systems have been generally successful, they are not entirely satisfactory in all cases. For example, visible light beam transmitters are not useful in fog and under certain other atmospheric conditions, since they cannot be seen by the receiving station. In moving to avoid this and to provide a system useful in all weather conditions, directional beams of electromagnetic energy have been adapted, but in these cases, there is considerable beam divergence which makes it difficult to determine the precise location of the beam center.

SUMMARY OF THE INVENTION

Accordingly, it is an object of the present invention to overcome these and other difficulties by providing a novel and improved position locating method and apparatus which are useful for navigation purposes in all weather conditions.

Another object of the present invention is to provide an apparatus and method for determining the position of an observer relative to a given reference point which is useful in all weather conditions and indicates the range and the relative bearing therebetween.

Still another object of the present invention is to provide a position locating method and apparatus which is based on the transmission of signals from a single reference point and provides a directional beam which is not highly divergent.

Yet another object of the present invention is to provide a method and apparatus which is useful in all weather conditions for navigating a ship or plane and is operative for determining the range and relative bearing between a receiving station thereon and a transmitting or sending station, and for indicating the heading of the ship or plane.

According to one aspect of the present invention, the foregoing and other objects are achieved by a novel scheme which comprises transmitting a continuously and uniformly rotating, modulated, fan-shaped beam of energy, preferably from an infra-red laser source which can penetrate fog and is precise enough to allow information transmission over long distances, detecting the passage of the transmitted beam through a given position, which it is desired to locate with reference to the transmitting station, at a pair of points spaced apart a predetermined distance aboard a ship or plane located in the given position, and relying upon the beam modulation to determine the relative bearing between the receiving station and the transmitting station and upon the interval of time involved in receiving the beam between the spaced points to determine the distance therebetween and the heading of the ship or plane. A transmitter forming part of this invention includes a lens arranged for reflecting a laser beam and spreading the same vertically into a pattern which is commonly referred to as a "fan beam", or one which is very narrow in the horizontal plane but wide in the vertical plane, and further is provided with means for causing the same to rotate at a constant rate of speed. Using a fan-shaped directional beam substantially eliminates beam divergence and the problems usually encountered therewith. For receiving the rotating beam, this invention provides a device which, if desired, is adaptable for use while being held in the hands of an operator. The device comprises a pair of spaced inputs for sequentially receiving the rotating beam, and a lens and mirror arrangement associated with each of the inputs for directing the beam received thereby to a central housing having a single detector therein and also containing circuitry for measuring the time interval between detector pulses.

BRIEF DESCRIPTION OF THE DRAWINGS

Various other objects, features and attendant advantages of the present invention will be more readily appreciated as the same becomes better understood from the following detailed description, when considered in connection with the accompanying drawings, in which like reference numerals designate like or corresponding parts throughout the several Figures, and wherein:

FIG. 1A illustrates several angularly displaced positions of a rotating fan beam and the relationship thereto of a detector having fixedly spaced apart receiving points;

FIG. 1B illustrates the rotating fan beam in two angularly displaced positions and the relationship thereto of a detector having fixedly spaced apart receiving points as the same is used for making measurements of heading;

FIG. 3 is a perspective view from the observation side of a device for receiving a rotating beam at fixedly spaced apart inputs, which is shown being adapted for use in the hands of an observer;

FIG. 4 is a perspective view of the device illustrated in FIG. 3, showing the same from the beam-receiving side;

FIG. 5 is a top diagrammatic view of the device shown in FIGS. 3 and 4, illustrating the mode of operation thereof;

FIG. 6 is a block diagram of an electronic system for a single detector beam-receiving device;

FIG. 7 is a plot of a number of exemplary waveforms occuring at selected points in the embodiment of FIG. 6 during operation thereof;

FIG. 11 is a block diagram of a modified version of the electronic system shown in FIG. 6, wherein reception at each of a pair of fixedly spaced antennas of a beam-receiving device is alternately detected on only every other revolution;

FIG. 12 is a block diagram of an electronic system which may be used with the beam-receiving device of the present invention for providing information on the bearing of the same relative to the transmitting station; and, FIGS. 13A and 13B illustrates top and bottom views, in perspective form, of a beam rotator assembly for radiating either radio frequency electromagnetic radiation or acoustical sound waves.

DESCRIPTION OF THE ILLUSTRATED EMBODIMENTS

Figure 2:
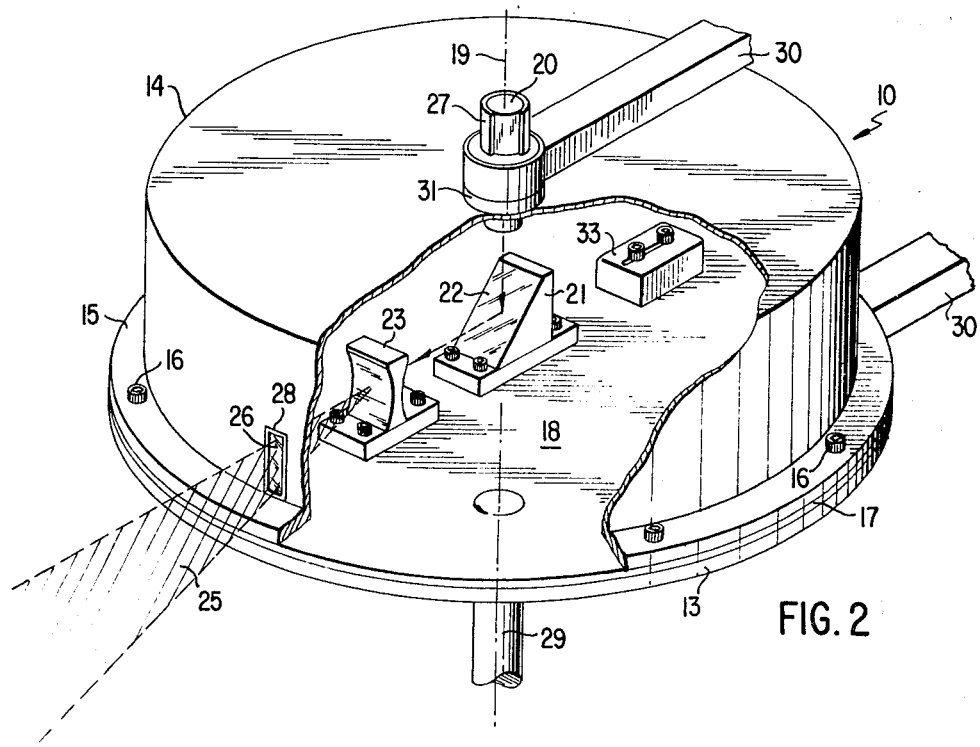
FIG. 2 is a perspective view, being partly broken away, of a device for transmitting a rotating fan-shaped beam.

The navigation system hereinbelow described is capable of providing an observer information regarding his range and bearing from a single rotating source of beamed energy and, in addition, when positioned aboard a vehicle, such as a ship or an aircraft, the system may also provide information relative to the heading of the vehicle. Referring, in particular, to FIG. 1, for an explanation of the theory of the present invention, the main components of the navigation system are illustrated in a horizontal plane, that is, a plane which is substantially parallel to the surface of the earth.

In FIG. 1A, a beam is shown in three distinct radial, or radiating, positions which it sequentially occupies as it is rotated at a precisely controlled constant rate of speed $\omega$. The beam is preferably generated by a rotatable infra-red laser source generally indicated by the reference numeral 10, which is particularly useful for this purpose in that an infra-red laser can generate a very well collimated beam of energy capable of penetrating most atmospheric conditions, including fog. The interval of time $\Delta t$ that elapses between the time the rotating beam is intercepted by a first beam-receiving element, or detector, 11, and by a second beam-receiving element, or detector, 12, which, according to this invention, are positioned a fixed distance L apart, is a unique function of the range, or distance, R, from the infra-red source 10 to the detectors 11 and 12 so long as a line drawn between the spaced detectors has a fixed angular relationship to the radiated beam as shown in "position 1" and in "position 3". If this line L is rotated, as illustrated in the Figure, a fixed angular relationship occurs when the elapsed time between interceptions by the detectors 11 and 12 is a maximum. Thus, in "position 2", it may be seen that the radiated beam would intercept the second detector 12 in a shorter period of elapsed time.

A geometric analysis of this situation indicates that
$$R = L/\mathrm{Sin}\,(\Delta\omega) = L/\mathrm{Sin}\,(\omega\Delta t)$$
where: $\Delta t$ is the maximum elapsed time.

Assume that $\Delta\omega = \omega\Delta t$ is quite small such that Sin $(\omega\Delta t)$ is proportional to $\omega\Delta t$. This is a common situation when the detectors, or beam-receiving elements, are quite far from the source as compared with the distance L separating the same. In this situation.
$$R \approx L/(\omega\Delta t)$$
Assume that the error in measurement of $\Delta t$ is $\delta$. That is,
$$\Delta t \to \Delta t' \pm \delta$$
where: $\Delta t'$ is the true elapsed time. In this case.
$$R \approx \frac{L}{w(\Delta t' \pm \delta)}$$
and if $\delta < < \Delta t'$, then
$$R \approx \frac{L}{w\Delta t'}\left(1 \pm \frac{\delta}{\Delta t'}\right)$$

The latter equation indicates that the relative error in range measurement is the same as the relative error in time measurement. Since time can be measured very precisely, this scheme is capable of equally precise range measurement. In fact, a precise timing signal can be modulated onto the beam and this signal used for measurement of $\Delta t$.

In the foregoing, it has been assumed that the detectors connected by the line L were in a horizontal plane. This can be assured by fastening a simple level to a device fixedly connecting the two beam-receiving elements. A more precise method results from simultaneously sweeping the beam in the vertical direction. Then the addition of two more detectors in the vertical plane allows the same maximum time scheme to be used for detection of vertical reference direction. In fact, a measurement of slant range to the source can be obtained.

The bearing of the observation point, or of a device having beam-receiving elements 11 and 12 mounted thereon, may be accurately monitored by modulating the frequency or phase of the infra-red beam in a linearly increasing fashion once during each revolution, thereby providing information which is proportional to the angular position of the beam when it is received, respectively, by the elements 11 and 12. That is, as the beam passes a fixed geographical reference, the frequency or phase starts to increase in a linear manner, and, when the beam has rotated one full revolution and again repasses this same reference, the frequency or phase rapidly returns to its original value and the process is repeated. Thus, the frequency or phase of the beam is proportional to, and is indicative of, its direction with respect to a fixed geographical reference.

FIG. 1B illustrates the relationship of the rotating beam and the beam-receiving elements 11 and 12, when the same are mounted aboard a vehicle, such as, for example, on the bow and stern of a ship, and is explanatory of the method adopted by the present invention for measuring the heading of the vehicle. For the purpose of explanation, assume that the beam radiating from the source 10 is received by the element 12 a period of time $\Delta t$ after being received by element 11. Since the speed $\omega$ of rotation of the beam is known, or may be provided along with the identification signal of the beam by modulating the amplitude thereof, and since the bearing information is also available, as hereinbefore discussed, it may be readily seen that the vehicle is under a course heading indicated in the figure either by "heading 1" or "heading 2", wherein, in the former case, the vector of the heading is illustrated by an arrow $a$ connecting elements 11 and 12 and representing the fixed distance therebetween, and in the latter case, the heading vector is illustrated by the arrow $a'$ connecting the beam-receiving elements 11 and 12'. This dual character of the headings can be resolved either magnetically, or by noting whether the beam arrives at "detector 2" prior to or after the time it arrives at "detector 1".

Referring now to FIG. 2, the device 10 for transmitting a rotating, fan-shaped beam is shown as including a flat circular plate member, or table, 13, and a cover 14 therefor, which is substantially tubular in configuration and is closed at one end and has an integral outwardly projecting flange 15 at the other end. The cover 14 is fastened to the table 13 by bolts 16 extending through the projecting flange 15, and is sealingly engaged therewith by an annular gasket 17 disposed therebetween to form a sealed cavity 18 which is devised for protecting the apparatus therein from adverse elements such as weather.

A beam 19 of radiation, such as, for example, an infra-red laser beam, is directed axially downwardly toward the center of the closed end of the cover 14, where it passes through a window 20 in the cover 14 and into the cavity 18. Disposed within the cavity 18 and secured to the top of the table 13 substantially centrally thereof is a mirror 21 securably fastened to the upper surface of the table 13 and having an inclined reflecting surface 22 for reflecting the beam 19 toward a concavo-concave lens 23, which also is suitably secured to the upper surface of the table 13. The beam 19 is spread vertically by the lens 23 into a fan-shape, as indicated by the reference numeral 25, which passes through another window 26 formed in the tubular wall portion of the cover 14 and aligned with the lens 23 and the mirror 21. The windows 20 and 26 may be formed of any suitable material having low attenuation and good transmittive properties for the laser beam, and since the interior of the device, or cavity 18, must be sealed against the weather and preferably is back filled with dry nitrogen, seals must be provided between the windows 20 and 26 and the cover 14, which are respectively indicated by the numerals 27 and 28.

The table 13 is coupled to an axial shaft member 29 positioned therebelow and connected with a suitable driving motor, not shown, for rotating the table at a constant angular speed and thereby rotating the fan-shaped beam 25 in the same fashion. Arms 30 projecting from a suitable stationary support structure, not shown, are connected to the rotating assembly through bearings 31 which are journalled about the seal 27, in the case of the upper arm, for supporting the assembly therefrom. Within the cavity 18, a counter-weight 33 is secured to the upper surface of the table 13 in alignment with the lens 23 and the mirror 21 for the purpose of dynamically balancing the table.

A hand-held beam signal-receiving device formed in accordance with the teachings of the invention is shown in FIGS. 3, 4, and 5 and is generally indicated therein by the reference numeral 35. The device 35 comprises a pair of beam-receiving elements generally indicated by the reference numerals 11 and 12 which are suspended in parallel fashion from opposite sides of a central housing 36 upon hollow arms 37 and 38, respectively, projecting therefrom. The beam-receiving elements 11 and 12 are identical, and each comprises, as best shown in FIG. 4 with respect to the element 12, a tubular sun shield 39 and a collimating lens 40. The lenses 40 may be rotated as desired by the knobs 41, both lenses being moved together, so that a beam radiating from a different elevation may be readily received. An inclined mirror 42 in each of the hollow arms 37 and 38, shown in FIG. 5, reflects the incident beam 25 passing through the collimating lenses 40 along the length of the hollow arms toward the central housing 36 wherein an additional set of mirrors 43 further reflect the respective beams into a concavo-concave collimating lens 44, which focuses the beam energy onto a suitable detector 45, which in the case of infra-red radiation, may be a bolometer. The output of the detector 45 is fed to an electronic system, which is described hereinbelow. The use of a single detector, such as the detector 45, to monitor the sequential passage of the beam through the beam-receiving elements 11 and 12, respectively, greatly reduces problems generally associated with temperature drift and relative sensitivities, which are present if two separate detectors are utilized.

The device 35 is shown having a handle 46 which adapts the receiver for being held in one hand of an observer, thereby permitting the other hand to be used for grasping one or the other of the knobs 41. Although illustrated in this fashion, however, it is to be understood that the device may also be mounted on a suitable support or modified for use aboard a vehicle, such as a plane or ship, in which case one of the elements 11 may be mounted on the bow and the other of the elements 12 on the stern.

When the device is used by an individual observer, it is rotated in a horizontal plane by means of the handle 46, until it is held in a position such that the time interval between reception of the rotating beam 25 by one of the elements 11 and 12, and then by the other of the elements, is maximized. The operator views the measure time interval on digital indicators 47, shown in FIG. 3, and shaded by screen 48, and in this manner determines the optimum reception orientation. In order to find the beam, he can quickly scan the horizon and listen with earphones for the proper identification signal, and once the signal direction is located, he can observe the visual indicators. Of course, it is to be understood that the counters or meter will reset on each revolution of the rotating beam, so that the indication will change during each revolution that a signal is being received.

The operation of the receiver device shown in FIGS. 3, 4, and 5 is best described by reference to a control circuit therefor, which is illustrated in one form of FIG. 6. The transmitted beam of energy, or signal, 25, is picked up by the antennas 11 and 12 and is sequentially directed thereby to the detector 45, as indicated hereinbefore.

The output of detector 45, responsive to the sweep or rotation of the beam past the antennas 11 and 12, is shown in FIG. 7–1 typically as a pair of sinusoid-type waves, each having a duration determined by the time required for the beam to rotate through the position of one of the antennas, and shown being overlapped, or with the end of the first or initial wave overlapping the beginning of the second wave. From the detector 45, the signal is passed into a video amplifier 50 and then to a conventional detector 51 for presenting the general envelope, or locus of the relative maxima of amplitudes of the signal, which is shown in FIGS. 7-2.

In order to derive a signal which will permit accurate determination of the time interval elapsing between the interception of the beam by one of the antennas, or beam-receiving elements, 11 and 12, and the interception of the beam by the other of the pair of elements, the output of the envelope detector 51 is connected to amplification and differentiation means 52 for providing an output, such as shown in FIG. 7-3, of sharp pulses located in time corresponding to and having the same respective polarity as the positive and negative going transitions of the sinusoid waveforms of FIG. 7-2. A clipper device 53 is operative to separate the positive polarity pulses from the waveforms shown in FIG. 7-3, whereby the output therefrom is in the form of two distinct and separate positive sharp pulses shown in FIG. 7-4. This clipper may include unilateral conductive devices, such as diodes of appropriate type, rectifiers or any other suitable component which will pass only signals of a predetermined polarity.

Connected to the output of the clipper 53 is a flip-flop 54, which conventionally changes its output state each time it is triggered by a pulse of the wave train of FIG. 7-4 and, as shown in FIG. 7-5, is operative to be triggered from a first or ground state by the first positive pulse corresponding in time to the beginning of reception of the beam by the first of the intercepting antennas 11 and 12, to a second state in which it remains until the next positive pulse corresponding in time to the reception of the beam by the second of the intercepting antennas. Upon being triggered by this latter pulse, the flip-flop output reverts abruptly to the ground state.

The output of flip-flop 54 is connected to one input terminal of a two input terminal coincidence or AND gate 55. The other of the input terminals of the AND gate 55 is connected to the output of the amplifier 50 or to another source, such as a clock, for providing high frequency precision-timed pulses. Because the gate 55 is able to provide a signal at its output only when a signal representing the second state of the flip-flop 54 is conicidentally present at the input terminals thereof along with the aforementioned timing pulses, the gate output is, like that of the output of flip-flop 54, a sharp rectangular waveform, the duration of which is precisely equal to the time elapsing between the sequential interceptions of the rotating beam 25 by the inputs or beam-receiving antennas 11 and 12.

Figure 8A:
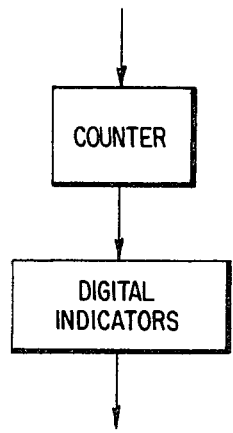
FIG. 8, A thru D, illustrates block diagrams of four indicating circuits which may be used with the electronic system of FIG. 6.
Figure 8B:
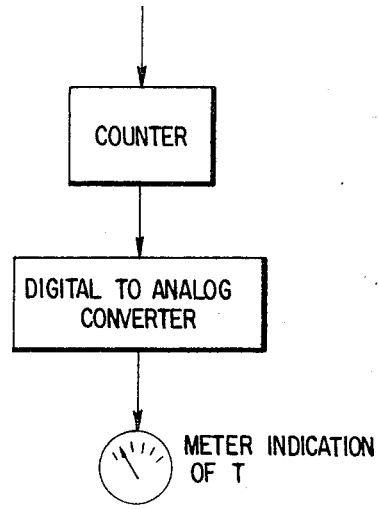
Figure 8C:
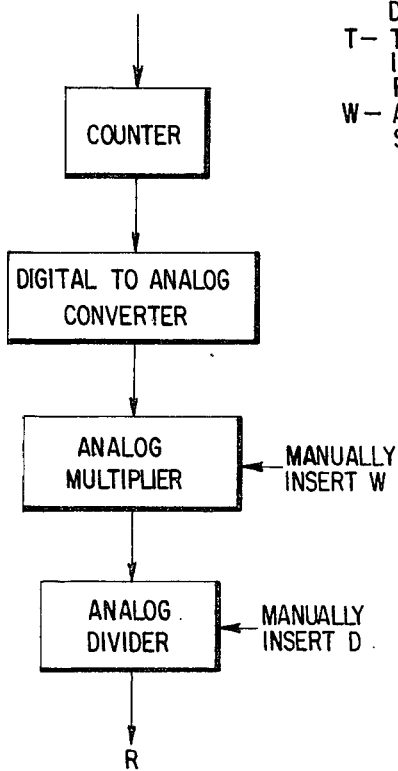
Figure 8D:
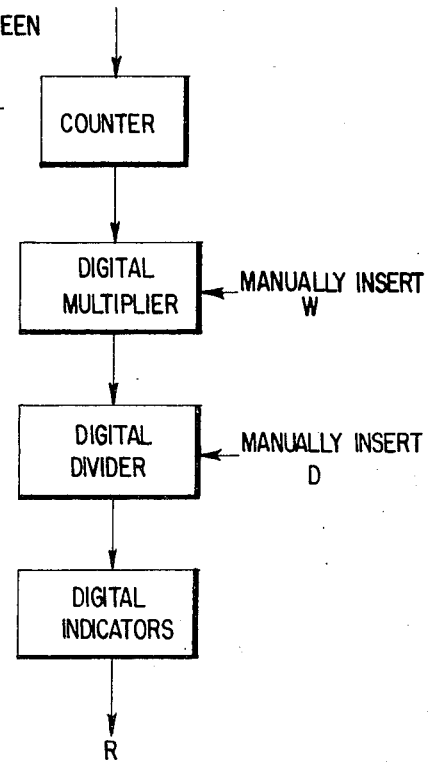

Accordingly, referring now to FIG. 8, the output of the AND gate 55 may be connected to the indicating circuitry of either FIG. 8A or FIG. 8B for indicating the time interval between interceptions of the rotating beam, and to the indicating circuitry of either FIG. 8C or FIG. 8D for indicating the range, or distance, between the rotating source of beam energy and the beam-receiving antennas 11 and 12, as desired, according to whether a digital or an analog indication is preferred. In computing the range, it may be seen that the angular rotational speed of the source and the distance separating the beam-receiving elements 11 and 12, which are constant, known factors, or are provided by suitable modulation of the beam signal as hereinbefore indicated, are manually inserted into the respective multipliers and dividers of FIG. 8C and FIG. 8D.

Although not shown, it is to be understood that means are provided for resetting the counters or meters on each revolution of the rotating beam which may conveniently be connected to the output of either the flip-flop 54 or the AND gate 55.

Figure 9:
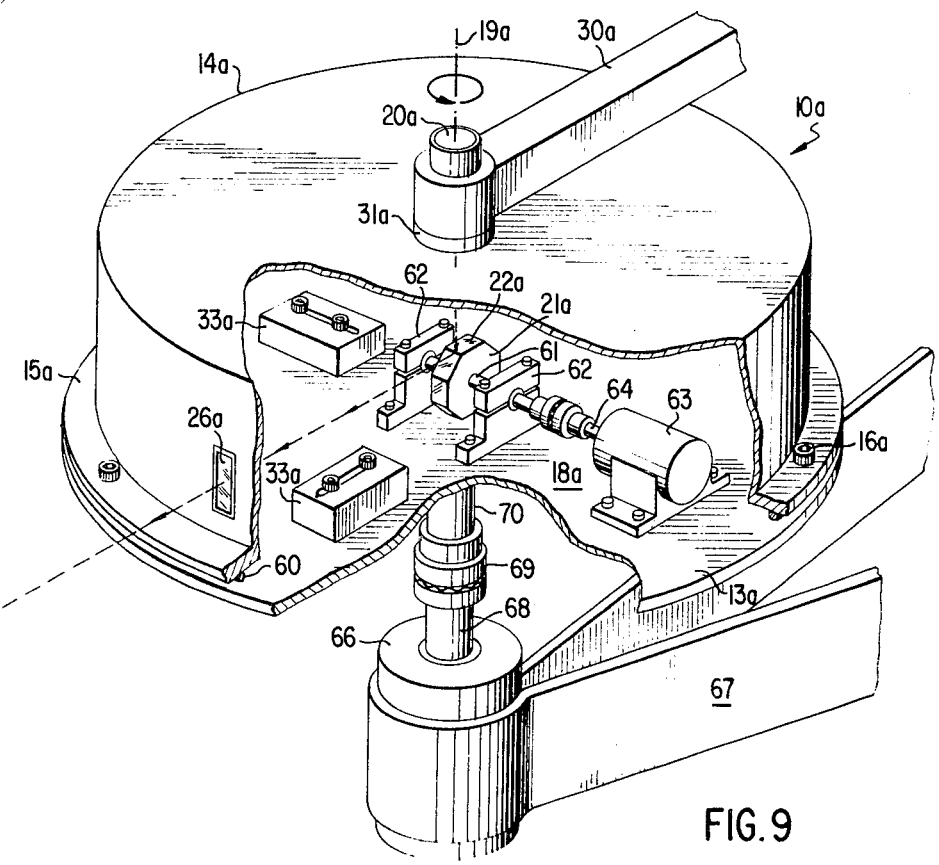
FIG. 9 is a perspective view, being partly broken away, of another embodiment of a device for transmitting a rotating fan-shaped beam of energy.

In FIG. 9 there is shown another embodiment of a device formed in accordance with the teachings of this invention for transmitting a rotating fan-shaped beam of energy. The device is generally indicated by the numeral $10_a$ and comprises a table $13_a$, a cover $14_a$ therefor having a projecting flange $15_a$ at one end for securing the same to the table by bolts $16_a$ with a circular O-ring 60 sandwiched therebetween for sealing the device interior, or cavity, $18_a$ completely from external influence, such as the elements of weather.

Within the cavity $18_a$, there is disposed a mirror element $21_a$ having a plurality of reflecting surfaces $22_a$, being shown as eight in number, disposed below a window $20_a$ in the top surface of the cover $14_1$. The mirror is supported on a shaft 61 journalled on either side thereof in a pair of pillow blocks rigidly fastened to the top surface of the table $13_a$ for rotation about a horizontal axis by a motor 63 coupled thereto by a driving shaft 64 and a flexible coupling 65.

The table $13_a$ is rotatable about a vertical axis by a motor 66 which is supported from a frame, not shown, by a bracket 67 and is connected to the table through a driving shaft 68, a flexible coupling 69 and a shaft 70 depending from the table. The table $13_a$ and the cover $14_a$ are supported by an arm $40_a$ projecting from the support frame and connected to an axially disposed shaft member in the cover $14_a$ through a bearing $31_a$. Counter-weights $33_a$ permit the assembly to be dynamically balanced.

Thus, upon introducing a beam of energy $19_a$ axially downwardly through the window $20_a$, and upon rotating the mirror $21_a$, as each surface $22_a$ of the mirror rotates under the beam, the angle of reflection changes, thereby causing the reflected beam $25_a$ to sweep in a vertical direction. This sweeping beam forms a fan-shaped geometry, which passes from the device through a substantially vertical window surface $26_a$ formed in the wall of the cover $14_a$, and the rotation of the table assembly by the motor 66 thus causes the fan-shaped, nutating beam to rotate.

Figure 10:
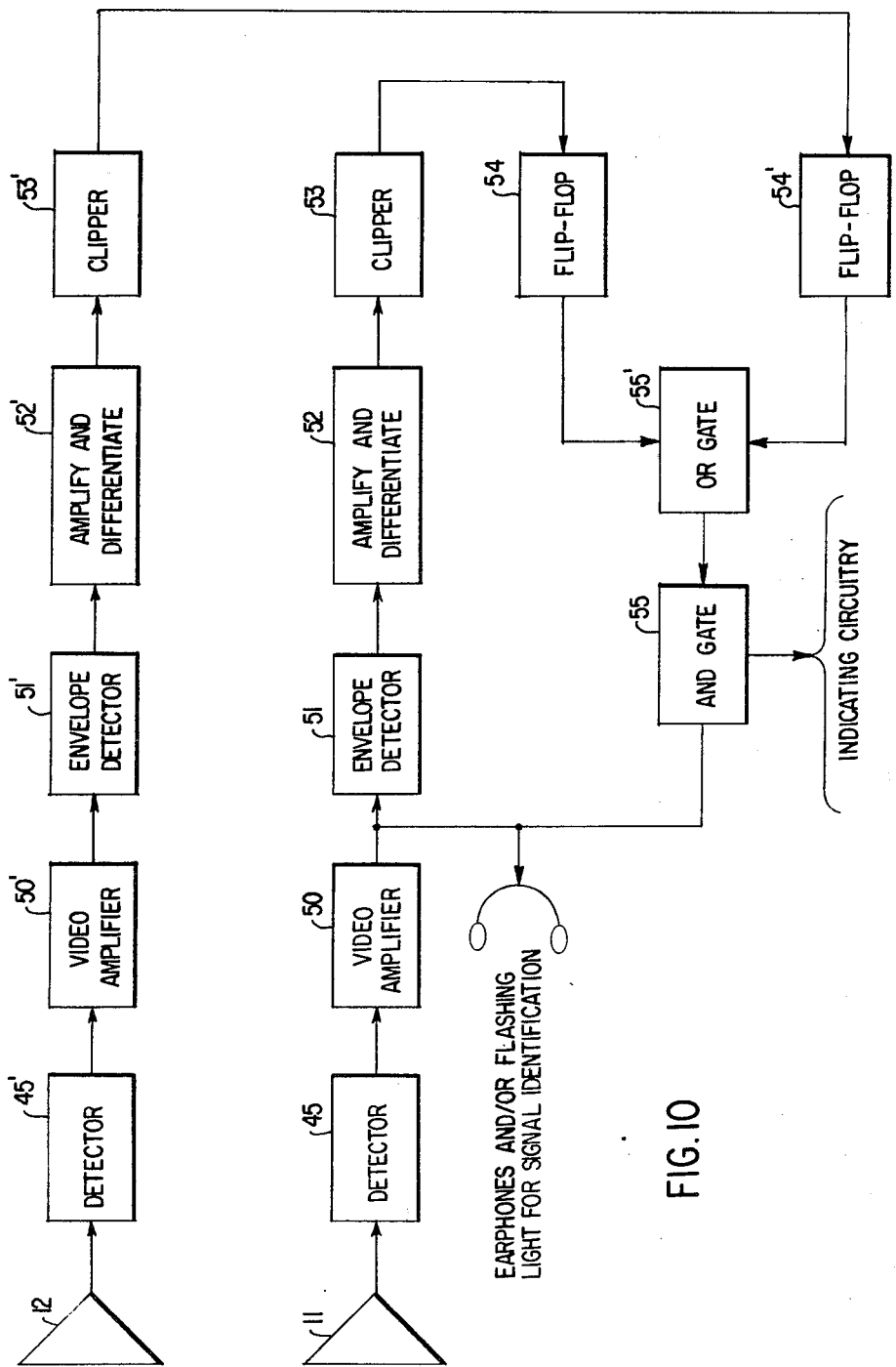
FIG. 10 is a block diagram of another embodiment of an electronic system which may be used with a beam-receiving instrument having two detectors.

FIG. 10 illustrates another embodiment of an electronic system for use with a beam-receiving instrument of the type described hereinbefore, but characterized by a pair of detectors 45. Thus, referring back to FIG. 5, the detector 45 and the collimating lens 44 therefor may be moved to the same position as the mirrors 42, in which case, two detectors and collimating lenses are used.

Accordingly, in FIG. 10, there is shown a pair of detectors 45 and 45' which are respectively connected to the beam-receiving elements, or antennas, 11 and 12. The outputs of these detectors are respectively connected to video amplifiers 50 and 50', and these outputs are connected to the envelope detectors 51 and 51'. From the envelop detectors, the outputs are respectively directed to differentiators 52 and 52', clippers 53 and 53', and flip-flop switches 54 and 54'. The outputs of the flip-flops 54 and 54' are connected to the input terminals of a two input terminal coincidence or AND gate 55', and this gate output is connected to one input terminal of another AND gate 55. Connected to the other input terminal of the AND gate 55 is a line 56 from the outputs of video amplifiers 50 and 50' which, if desired, may also be connected to another source, such as a clock, for providing high frequency precision-timed pulses.

Thus, the flip-flops 54 and 54' may be so arranged that upon triggering of one, the AND gate 55' will be opened to provide an output therefrom to the AND gate 55. The pulses entering the output AND gate 55 are then permitted to enter the indicating circuitry. When the second flip-flop is triggered, or when the rotating beam is intercepted by the second detector, the output from the AND gate 55' is discontinued, as is the output from the AND gate 55. Since the flip-flop is a toggle device, it stays on until reset, and the first flip-flop is thereby reset by the second flip-flop turn-on.

Although the invention has been described primarily with reference to the use of infra-red laser beam energy, it is entirely possible that the navigation system will utilize radio frequency electromagnetic energy or acoustic energy. In these events, the sun shields 39 and the collimating lenses 40 obviously may be replaced with electromagnetic or acoustical substantially conical-shaped horns, not shown, of conventional construction, for receiving the transmitted beam. Also in this case, the hollow arms 37 and 38 become electromagnetic wave guides or acoustic ducts. Similarly, the collimating lens 44 and the bolometer detector 45 may be replaced by, respectively, a radio frequency diode or a sensitive acoustic transducer in a known conventional manner.

When radio frequency or acoustic sources are used rather than lasers, the beam width, as indicated hereinbefore, becomes tremendously larger. In fact, when sufficiently far from the source, the beam width becomes much wider than the detector spacing. When this occurs, the sequential passing of the beam through the two detectors no longer forms two distinguishable pulses as shown in FIG. 7. Accordingly, since two separate detector pulses do not occur in these cases, the electromagnetic or acoustic horns on each side of the receiver may be electronically gated by means of varacter diodes in the electromagnetic case, or electromagnetically controlled pistons in the acoustic case. Thus, each detector is made to respond to the beam alternately once every other revolution, and, since the angular rotational speed is known and the time of beam passage between detectors can be obtained, this scheme offers two separate distinct pulses to the receiver so that precise time measurements can be made.

Accordingly, referring to FIG. 11, which illustrates a navigational receiver which is used for reception at each antenna on every other revolution, there is shown gates 1 and 2, driven by a flip-flop 54, which insures that only one or the other of the beam-receiving elements, or antennas, 11 and 12, is active. Assuming that the gate 1 is active, the signal enters antenna 12 and passes through the signal processing circuitry comprising detector 45, video amplifier 50, envelope detector 51, differentiator 52, clipper 53, and the flip-flop 54, triggering the latter and causing the same to change state. This change of state of the flip-flop 54 turns off the gate 1 and opens gate 2. Subsequently, the signal from the next revolution of the rotating beam is received by the second antenna 11, so that the process is repeated.

A signal from gate 2 is fed back to the flip-flop 54 to insure that when gate 2 is open, the flip-flop is in a specific state. This insures that the flip-flop 54 is in proper synchronization with the input signals.

The indicating circuitry then constantly subtracts the time for one revolution from the indicated time, thereby yielding the time for the beam to pass from antenna 12 to antenna 11.

In all of the above cases, the transmitter identification information is preferably obtained by listening with earphones or the like, and may take the form of Morse Code or similar amplitude modulation. One circuitry embodiment for obtaining bearing indication is shown in FIG. 12. It should be noted that bearing information can be obtained in the frequency or phase of a sinusoidal signal which is amplitude modulated onto the carrier. Thus, a signal is taken from the output of the envelope detector 51 and passed through an amplifier 73, a discriminator 74, and to a sample-and-hold circuit 75, to the latter of which a sampling signal is also provided from the output of the differentiator 52. The sample-and-hold circuit 75 may be connected to a visual or digital indicator or display device 76.

FIG. 13 illustrates a double beam rotator assembly conventionally designed for transmitting either radio frequency electromagnetic radiation or, in the case of an acoustic source, sound waves. The device includes a weather-tight housing 77 which contains the phase shifting and/or electronic steering apparatus, and is provided with a plurality of apertures 78 for radiating the radio or sound waves. The phase of each individual aperture is controlled to produce the desired beam pattern, which may be either shaped into a fan directly, or may be electronically moved up and down so as to create a fan shape. Shaft 80 couples the housing 77 to a synchronous motor, not shown, which causes the assembly, and thus the beams or fans, to rotate at a precise rate. Depending from the lower surface of the housing 77 is an electromagnetic waveguide or an acoustic duct 81, as the case may be, depending upon whether the assembly is used for electromagnetic or acoustic radiation, respectively. A recessed hole 79 in the bottom of the housing 77 for weather protection services a choke joint 82 which is rotatable in the waveguide or sound duct 81 and provides an electrical or acoustical connection in the absence of a mechanical connection.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A navigation system for determining position with respect to a transmitter station, comprising:
   a transmitting station including a closed housing having an inlet window in one wall thereof and an outlet window in another wall thereof, a mirror fixedly positioned in said housing and having a reflective surface thereof aligned with said inlet window, a source of energy outside said housing for generating a beam of radiation energy through said inlet window and against said reflective surface of said mirror, a lens disposed between said reflective surface of said mirror and said outlet window in said housing for receiving the beam reflected from said reflective surface and spreading the same vertically into a fan-shaped geometry to be passed through said outlet window, and means for rotating said housing at a substantially constant angular velocity; and
   a receiver including means for receiving said rotating fan-shaped energy beam at a pair of fixedly spaced points, a single detection means responsive to said energy beam received at said space points for producing an output, and circuitry responsive to said detection means output for determining the position of the receiver relative to said transmitting station.

2. The navigation system set forth in claim 1, wherein said transmitting station further includes means for modulating the rotating fan-shaped energy beam being generated with a frequency modulated signal according to a predetermined pattern during each revolution of said beam for providing continuous information regarding the angular position thereof relative to a fixed geographical reference.

3. The navigation system set forth in claim 2, wherein said transmitting station further includes means for modulating the amplitude of the beam being generated with high frequency repetitive pulses to provide precise timing signals for measurement at the receiver.

4. The navigation system set forth in claim 1, wherein said circuitry includes means for timing an interval between the reception of said rotating energy beam at one of said pair of spaced points and reception of said rotating energy beam at the other of said pair of spaced points.

5. The navigation system set forth in claim 1, wherein said rotating fan-shaped beam of energy is a laser beam of infra-red energy.

6. The navigation system set forth in claim 1, wherein said rotating fan-shaped beam of energy being generated is a beam of electromagnetic energy.

7. The navigation system set forth in claim 1, wherein said rotating fan-shaped beam of energy being generated comprises sound waves.

8. A navigation system for determining position with respect to a transmitter station, comprising:
   a transmitting station including a closed housing having an inlet window in one wall thereof and an outlet window in another wall thereof, a multi-surfaced mirror disposed in said housing in alignment with said inlet window therein, means for rotating said mirror at a constant speed, a source of energy disposed outside said housing for generating a beam of radiation through said inlet window toward said rotating mirror, whereby the beam reflected therefrom is caused to sweep in a vertical direction, said outlet window being disposed in alignment with said reflected beam, and means for rotating said housing at a constant angular speed; and
   a receiver including means for receiving said rotating fan-shaped energy beam at a pair of fixedly spaced points, a single detection means responsive to said energy beam received at said spaced points for producing an output, and circuitry responsive to said detection means output for determining the position of the receiver relative to said transmitting station.

9. The navigation system set forth in claim 1, wherein said receiver comprises:
   a central housing,
   a pair of hollow beam-conducting arms extending in opposite directions from said housing,
   a beam-receiving input arm connected to the remote end of each of said hollow arms and projecting substantially perpendicularly therefrom,
   a mirror in each of said hollow arms at the juncture thereof with said beam-receiving arm for reflecting a beam received therein along said hollow arm and in the direction of said housing,
   a detector in said housing,
   means for reflecting beams received in said housing toward said detector, and,
   means for measuring the time interval between detection of a beam received by said detector from one of said beam-receiving arms and of the same beam received by the other of said beam-receiving arms.

10. The navigation system set forth in claim 9, further including an indicating means in said receiver housing for visually indicating the time interval between detection of the rotating beam by the respective beam-receiving inputs, and,
   handle means secured to said housing for permitting the same to be held in the hand of an observer.

11. The navigation system set forth in claim 10, wherein said beam of energy is derived from an infrared source and said detector in said receiver housing is a bolometer.

12. The navigation system set forth in claim 1, wherein said circuitry includes:
   means connected to said detection means output for producing first and second discrete signals responsively to changes in received energy occurring upon rotation of said fan-shaped energy beam by said pair of fixedly spaced points,
   means triggered by one of the first and second discrete signals corresponding to the received energy change due to rotation of said energy beam past the first of said pair of fixedly spaced points, for providing an output signal having a duration determined by an interval between the discrete signals respectively applied thereto,
   a clock pulse generator,
   gate means coupled to said clock pulse generator and said means for providing an output signal of a duration equal to the interval between said discrete signals for passing pulses from said generator, and,
   indicating means for counting the pulses passed by said gate means.

13. The navigation system set forth in claim 12, wherein said indicating means further includes:

multiplier means having said constant angular velocity of said rotating fan-shaped energy beam set thereinto, divider means having the distance separating said pair of fixedly spaced points set thereinto, and, means including said pulse counting means, said multiplier means and said divider means for determining the distance between said transmitting station and said receiver.

14. A transmitting apparatus for a position-determining system, comprising:

a housing having an inlet window in one wall thereof and an outlet window in another wall thereof, a mirror fixedly positioned in said housing having a reflective surface thereof which is aligned with said inlet window, a source of energy outside said housing for generating a beam of radiation through said inlet window and against said reflective surface of said mirror, a lens disposed between said reflective surface of said mirror and said outlet window in said housing for receiving the beam reflected from said reflective surface and spreading the same vertically into a fan-shaped geometry to be passed through said outlet window, and, means for rotating said housing about a predetermined axis at a constant angular velocity.

15. The transmitting apparatus set forth in claim 14, wherein said source of energy is an infra-red laser beam.

16. The transmitting apparatus set forth in claim 14, wherein said lens is a concavo-concave lens.

17. A transmitting apparatus for a position-determining system, comprising:

a housing having an inlet window in one wall thereof and an outlet window in another wall thereof, a multi-surfaced mirror disposed in said housing with the reflective surfaces thereof in alignment with said inlet window therein, means for rotating said mirror at a constant speed, a source of energy disposed outside said housing for generating a beam of radiation through said inlet window toward said rotating mirror, whereby the beam reflected therefrom is caused to sweep in a vertical direction, said outlet window being disposed in alignment with said reflected beam, and, means for rotating said housing at a constant angular speed.

18. The transmitting apparatus set forth in claim 17, wherein said source of energy is an infra-red laser beam.

19. The transmitting apparatus set forth in claim 17, wherein said multi-surfaced mirror is an octagonal-surfaced mirror.

20. A method for determining position with respect to a transmitting station, comprising the steps of:

generating a fan-shaped directional beam of energy from said transmitting station, rotating said fan-shaped energy beam at a substantially constant angular velocity, receiving said rotating fan-shaped energy beam at a pair of spaced-apart receiving stations remote from said transmitting station, detecting the receipt of said energy beam by the first of said receiving stations to receive the same during a given revolution thereof, detecting the receipt of said energy beam by the other of said receiving stations during the next succeeding revolution thereof, measuring the interval of time between detection of said beam by said beam-receiving stations in two successive revolutions, subtracting the time required for rotating said beam through one revolution at said constant angular velocity from said interval of time between said detections, and determining the distance between the transmitting station and the beam-receiving stations by calculating the time required for said beam of energy to pass through the distance separating said receiving stations.

* * * * *